Sept. 1, 1931.        H. E. HINTZ        1,821,514
MECHANISM FOR ELECTRIC CONTROL OF MECHANICAL MOVEMENTS
Filed June 6, 1927        3 Sheets-Sheet 1

H. E. HINTZ    INVENTOR.

BY
Merrill M. Blackburn
ATTORNEY

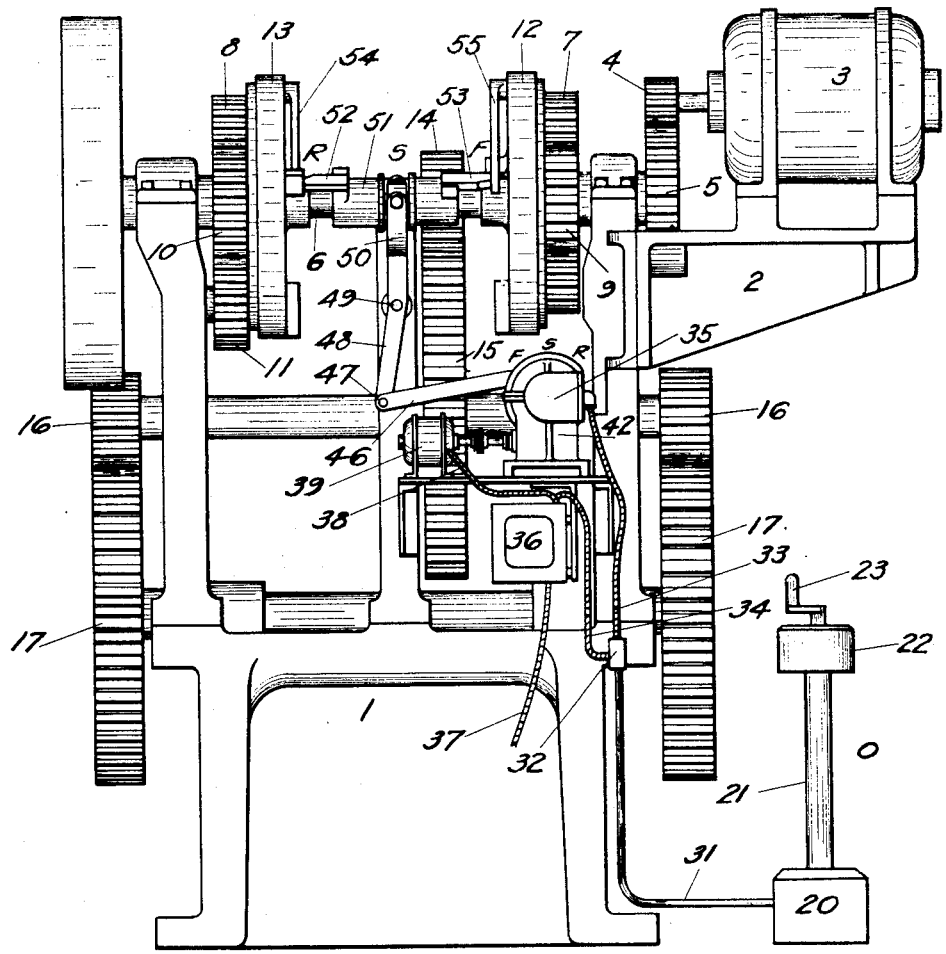
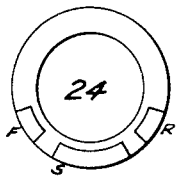
FIG-3
FIG-4
FIG-5
H. E. HINTZ INVENTOR
BY Merrill M. Blackburn
ATTORNEY Sept. 1, 1931.                  H. E. HINTZ                   1,821,514
           MECHANISM FOR ELECTRIC CONTROL OF MECHANICAL MOVEMENTS
                       Filed June 6, 1927        3 Sheets-Sheet 3
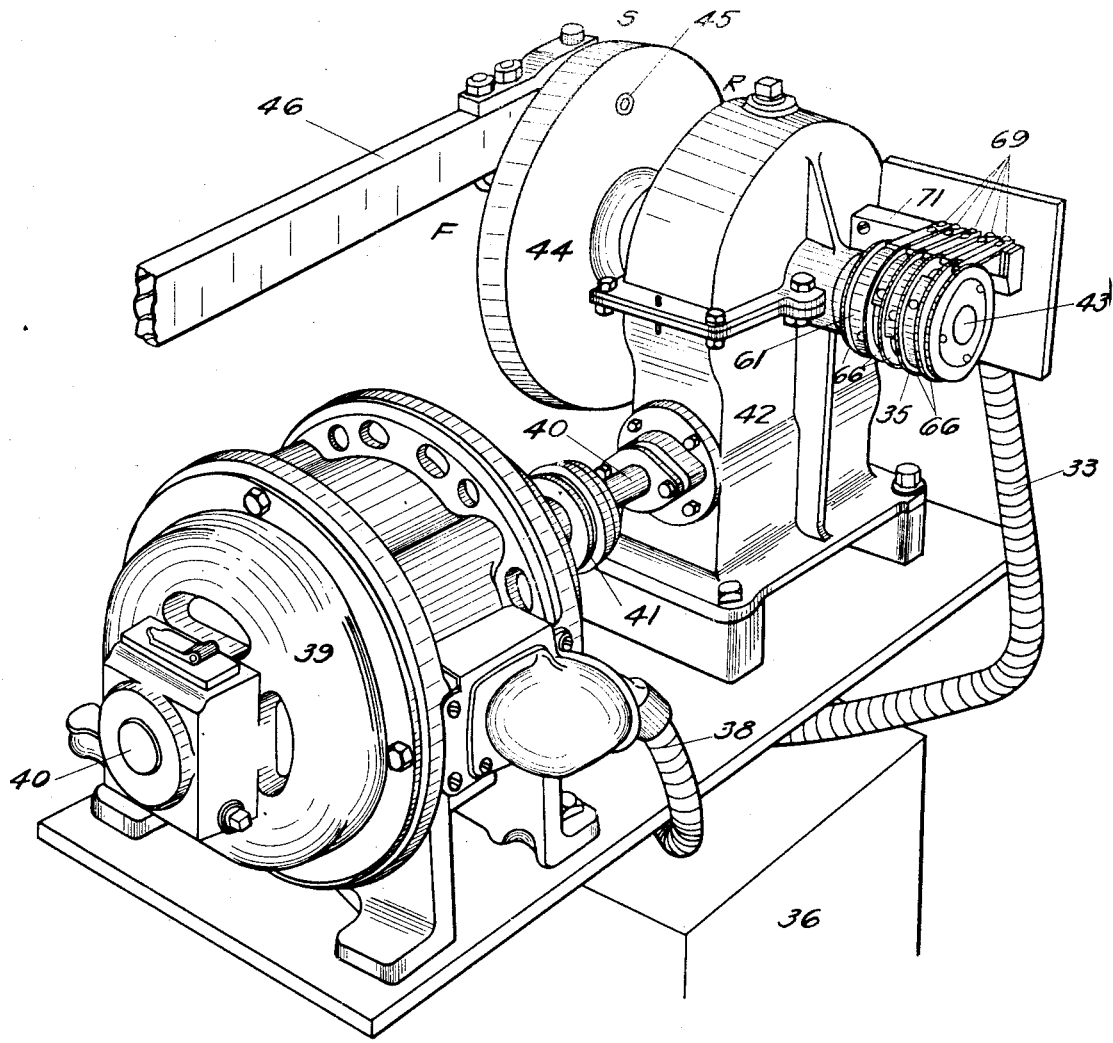
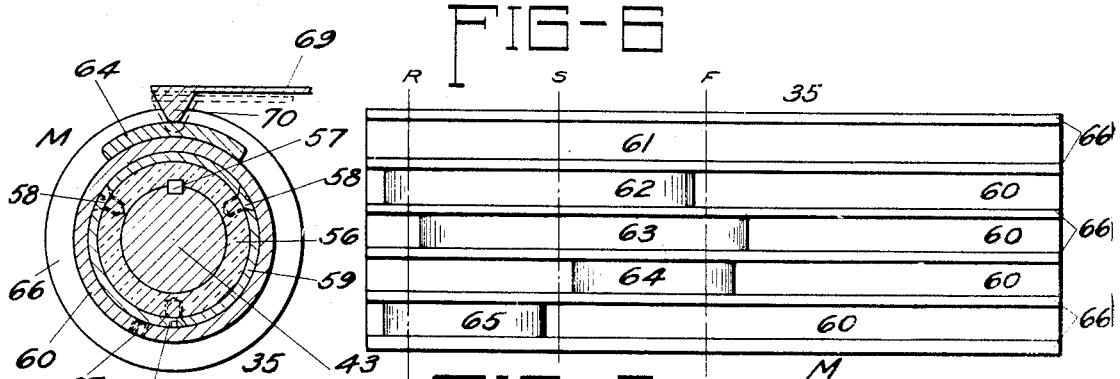
H. E. HINTZ INVENTOR
BY Merrill M. Blackburn
                ATTORNEY Patented Sept. 1, 1931

1,821,514

UNITED STATES PATENT OFFICE

HENRY E. HINTZ, OF MOLINE, ILLINOIS, ASSIGNOR TO WILLIAMS, WHITE & CO., OF MOLINE, ILLINOIS, A CORPORATION OF ILLINOIS

MECHANISM FOR ELECTRIC CONTROL OF MECHANICAL MOVEMENTS

Application filed June 6, 1927. Serial No. 196,802.

My invention pertains to means for starting and stopping a motor and predetermining the direction of rotation thereof and the point at which the motor ceases to rotate.

Among the objects of my invention are to provide a readily controllable motor operated clutch for driven machinery; to provide a device of the character indicated which may be both manually and automatically actuated; to provide an improved electrical control for a mechanical movement; to provide mechanism whereby the operated machine may be advanced either forwardly or rearwardly, either continuously or intermittently, as desired; to provide improved mechanism for accomplishing the functions stated; to provide suitable switches for accomplishing the desired or necessary changes in the electrical circuits; to provide an improved mechanism for controlling the functioning of electric motors; and such further objects, advantages and capabilities as will hereafter appear and as are inherent in the construction disclosed. My invention further resides in the combination, construction and arrangements of parts illustrated in the accompanying drawings and, while I have shown therein what is now considered the preferred embodiment of my invention, I desire the same to be understood as illustrative only and not as limiting said invention.

Figure 1:
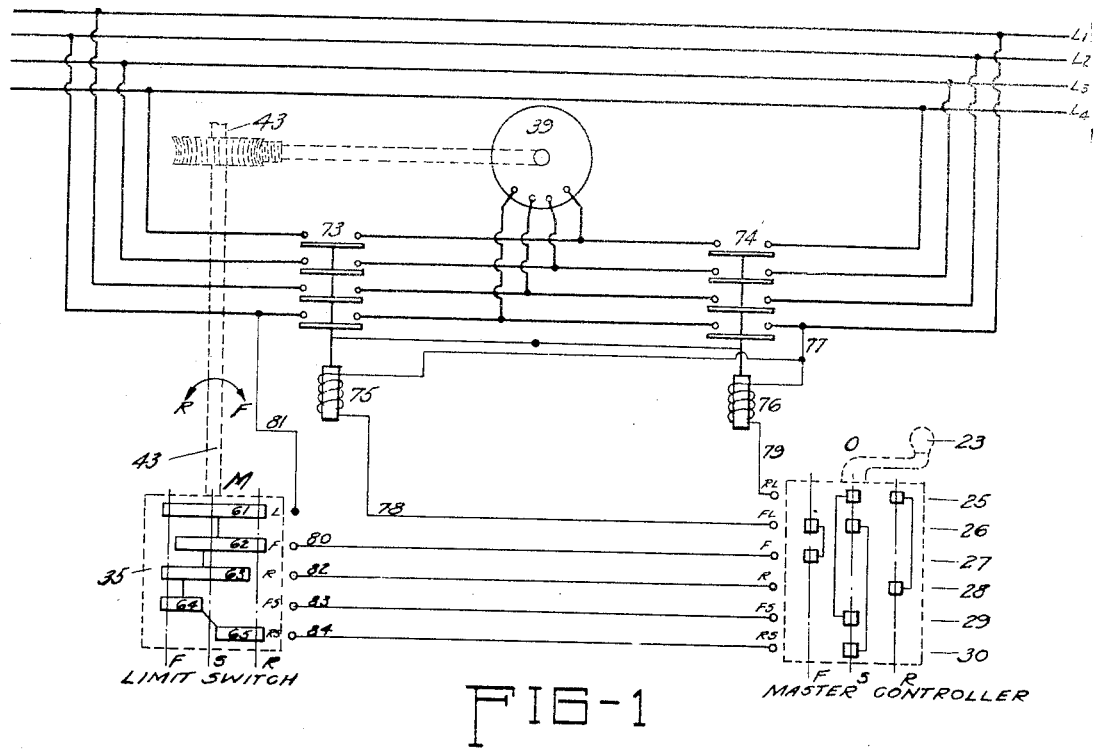
Figure 2:
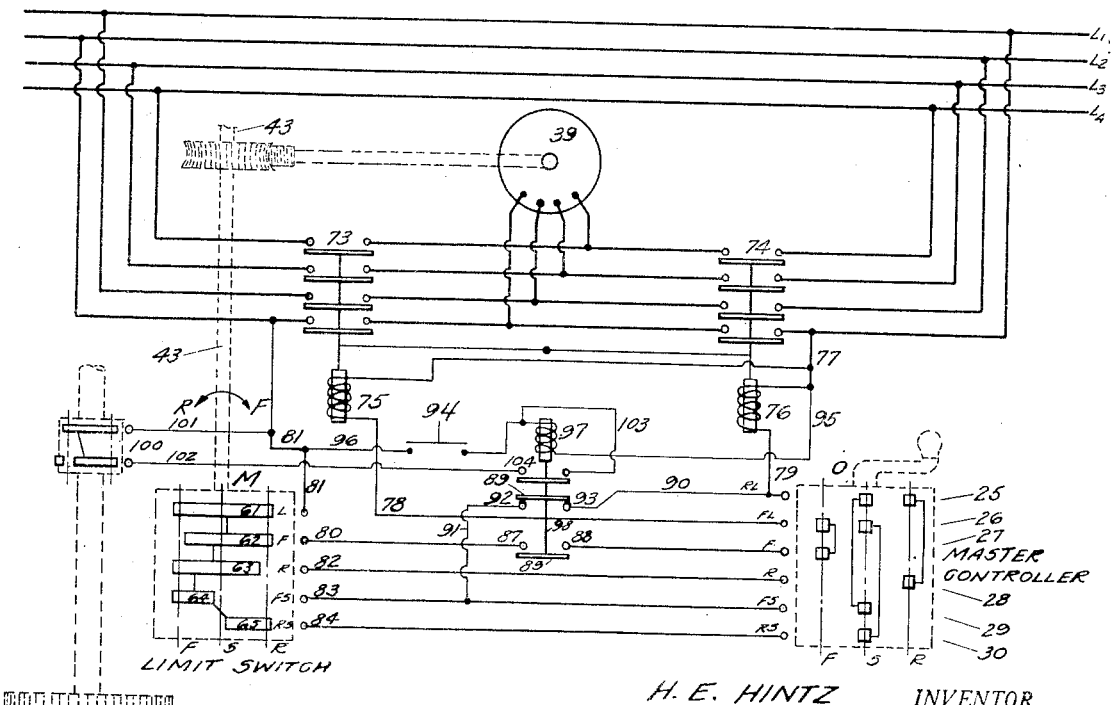

In the drawings annexed hereto and forming a part hereof, Fig. 1 shows a wiring diagram of the electrical circuit of my construction; Fig. 2 shows a similar wiring diagram, illustrating the use of an automatic stopping mechanism for stopping the controlled machine at any desired point; Fig. 3 is an end elevation of a machine, showing my invention applied thereto for controlling the clutch thereof; Fig. 4 is an end elevation of a contact carrying block used in the master controller switch, which is illustrated in Fig. 3 as having somewhat the shape of a controller; Fig. 5 is a diagrammatic expanded view of the switch shown in Fig. 4; Fig. 6 is a perspective view of a portion of the mechanism shown in the center of Fig. 3; Fig. 7 is a cross section of the limit switch shown at the right side of Fig. 6; Fig. 8 is a diagrammatic expanded view of the limit switch shown in Figs. 6 and 7, to show the relationship of the contacts of this switch.

Referring more in detail to the annexed drawings, in Fig. 3 numeral 1 designates the controlled machine which, in the present instance, happens to be a horizontal press. Mounted upon the upper right-hand side of this machine is a bracket 2 carrying a motor 3 for operating the machine. The shaft of the motor 3 has a pinion 4 thereon which meshes with a gear 5 on the shaft 6. A transverse shaft beyond the shaft 6 carries the gears 7 and 8 and the shaft 6 carries suitable gears 9 and 10 the former of which meshes with the gear 7. An intermediate gear 11 meshes with the gears 8 and 10 for reversing the direction of rotation of the transverse shaft, notwithstanding the fact that shaft 6 rotates always in the same direction. Instead of using the motor 3 and gears 4 and 5, a pulley may be substituted for the gear 5 and the machine be driven from a suitable power shaft. The mechanism for connecting the driving shaft 6 with the driven transverse shaft by means of clutches 12 and 13 is old and well-known and need not be detailed here. Also, it is unnecessary to set forth in detail the operation of the intermediate gears 14, 15, 16 and 17, these being old and well-known and forming no part of the present invention.

While my invention has been shown in the present drawings as applied to the control of the movements of a horizontal press, it has, in practice, been applied to other mechanisms and is capable of application, with but slight modifications, to the control of various other mechanisms. The foregoing description is a general description of the operating parts of a horizontal press, with particular reference to Fig. 3. Referring now more particularly to Figs. 3 and 6, the application of my improvement to this horizontal press will be described. There is here shown a master controller switch O comprising a base 20, supporting standard 21, switch box 22 and operating handle 23. Within the box 22 is a switch element 24, shown in Fig. 4 as being cylindrical in form and having a plurality of rows of contacts on the exterior face thereof. In Fig. 5 this cylinder is shown as opened up and flattened out into a plane in order to show diagrammatically the arrangement of these contacts. One row of contacts is designated F, one S, and one R, indicating respectively, "forward", "stop" and "reverse". Inside of the switch box 22 are contact fingers so positioned as to engage these various contacts as the switch drum 24 is rotated about its vertical axis by means of the handle 23. These contacts of the switch drum are arranged in a plurality of horizontal rows 25, 26, 27, 28, 29 and 30, as shown in Fig. 5, these horizontal rows having marked at the lefthand side thereof in this figure the letters RL, FL, F, R, FS, and RS to indicate the circuit wires which are connected to the fingers engaging the switch contacts.

It will be understood from the foregoing that when the crank 23 is turned to the middle or neutral position, otherwise designated as the "stop position", the contact fingers will rest upon the S column of contacts. It will be noted that a jumper wire connects the contact S25 to the contact S29 and that a similar wire connects the contact S26 to the contact S30. The purpose of this will be explained more in detail in connection with Figs. 1 and 2. Similarly, when the contact fingers of this switch rest upon the R column of contacts, R25 will be connected to R28 by the jumper wire shown in dotted lines in Fig. 5, resulting in connection of two of the circuit wires as will be more fully explained hereinafter. Similarly, when the contact fingers rest upon the F column of contacts the contacts F26 and F27 will be connected to each other and to certain circuit wires, referred to more fully hereinafter.

A plurality of circuit wires lead from the switch box 22 thru the standard 21 and base 20 to a cable, conduit, or pipe 31 and from there to the controlling mechanism mounted upon the machine. In Fig. 3 there is shown a junction box 32 to which these wires go and from which extend cables 33 and 34, leading, respectively, to the limit switch 35 and the switch box 36 in which is located the magnetic switch. A power cable 37 leads also to the magnetic switch and supplies the current needed in the operation of this device. A cable 38 leads from the magnetic switch to the motor 39. It will be understood that the cable 33 may lead from the limit switch to the magnetic switch and that the wires connecting the limit switch and the master controller switch may be included in the cable 34. This is indicated by the arrangement shown in Fig. 6.

Referring now more particularly to Fig. 6, it will be seen that the shaft 40 of the motor 39, having a suitable flexible joint 41 therein, leads into the casing 42 in which it has suitable operating connection with the shaft 43 as, for example, through a worm and worm gear. Therefore, when the rotor of the motor 39 turns, it will cause a corresponding rotation of the shaft 43 and the mechanisms connected therewith. The motor 39 is of the reversing type and is controlled by the magnetic switch as will be explained more fully hereinafter.

On one end of the shaft 43 is mounted a wheel 44 having a pivot pin 45 extending from one face thereof. Operatively connected to this pivot pin 45 is a link 46 pivotally connected at 47, as shown in Fig. 3 with the lever 48 pivoted at 49. This lever 48 has at its upper extremity a clutch operating yoke 50 having any suitable connection with the clutch sleeve 51. This latter carries the clutch operating cams 52 and 53 engaging, respectively, the crank arms 54 and 55 for operation of the clutches 13 and 12, referred to above. In Fig. 6 the crank pin 45 is shown at the top or in stop position. When this turns to the left, as designated by the letter F, it results in actuation of the forward clutch 12 and when it turns to the right, as designated by the letter R, it results in actuation of the reverse clutch 13, designated in Fig. 3 by the letter R. In this latter figure the letter S is used to denote the stop position of the clutch operating sleeve 51.

On the opposite end of shaft 43 from disk or wheel 44 is the drum switch 35, also called "limit switch". This drum switch is suitably insulated from the shaft 43 by means of insulating material 56 operatively connected to the shaft by a key or spline 57. Secured to this insulating material 56 by means of screws 58, or the like, is a conducting sleeve 59 upon which is adjustably mounted a plurality of metal rings 60 carrying suitable contacts 61, 62, 63, 64 and 65, the rings being held in place and operated by means of insulating washers 66 and set screws 67. Suitable contact fingers 69 having contact points 70 for engagement of the contacts 61 to 65 are carried by any suitable supporting means 71 and have connection with the wires passing through the cable 33 to the magnetic switch and the master controller switch, as shown more fully in Figs. 1 and 2. The limit switch may be enclosed in any suitable housing to prevent persons from coming in contact therewith, unintentionally or accidentally.

Referring now more particularly to Figs. 1 and 2, the connection and interrelation of the elements described above will be set forth. The magnetic switch, such as I ordinarily use, is provided with two sets of contacts 73 and 74, normally held open by spring means or otherwise. This switch is provided with electro-magnetic coils 75 and 76 which, when energized, close one or the other of the sets of contacts of the switch. Since the construction and operation of the magnetic switch is well known it is not deemed necessary to point out how the closing of the sets of contacts 73 and 74 reverses the direction of rotation of the motor. Neither is it deemed necessary to disclose how the opposed magnetic coils 75 and 76 act to close these separate sets of contacts. A connection 77 leads from the power line L 1 to wires connected to the magnetic coils 75 and 76. The other terminals of these magnetic coils are connected by wires 78 and 79 to the contact fingers FL and RL, respectively. It will therefore be understood that when the crank 23 is turned so that the F contacts engage the contact fingers FL and F, the circuit will be closed from the power line L 1 through wire 77, magnetic coil 75, wire 78, contact finger FL, contacts F 26 and F 27, contact finger F, wire 80, contact finger F of the limit switch, contacts 62 and 61, contact finger L and wire 81 back to the other power line L 2. When this occurs, the coil 75 will cause the magnetic switch to close so that the motor 39 runs in a forward direction causing the disk or wheel 44 to turn forwardly or toward the position indicated by the letter F in Figs. 3 and 6. This will push the link 46 to the left in Fig. 3, turning the lever 48 upon its pivot 49 and throwing the clutch sleeve 51 toward the right to the F position, thereby actuating the forward clutch 12 so that the press mechanism will be operated to advance the presser element.

When the limit switch has been rotated until the contact 62 is withdrawn from the F contact finger thereof the circuit of magnetic coil 75 will be broken, thus permitting the magnetic switch to open. When this happens motor 39 will stop but the forward clutch 12 will still be held in operative position so that operation of the motor 3 continues the advance of the presser element. In order to stop this, it is necessary to withdraw the sleeve 51 to the central or S position. This is done by turning the crank 23 to the S or stop position which connects master controller switch contact finger RL thru contacts S 25 and S 29 to contact finger FS. It also connects finger FL thru contacts S 26 and S 30 with contact finger RS. Limit switch M is still in the F position so that contact finger RS fails to engage contact 65 (see Figs. 1, 2 and 8) but contact finger FS is in engagement with contact 64, so that the circuit is completed through coil 76, the master controller and limit switches O and M, and wire 81 to the line wire L 2. This results in the magnetic coil 76 closing the magnetic switch to operate the motor 39 in the opposite direction from that in which it was operating before. However, contact 64 is short, as shown in Fig. 8 and when the limit switch has been rotated by the motor 39 to the S position (Figs. 1, 2, 3, 6 and 8), the circuit to coil 76 is broken, permitting the magnetic switch to open. This stops the motor 39 without withdrawing the presser element and that is held in the position to which it has been advanced. The operation of withdrawing the presser element will be next described.

Assuming the parts to be in the stop position, the crank 23 of the master controller O is turned to bring the R contacts in engagement with the contact fingers of this switch. When this is done, contact finger RL will be connected with contact finger R thru contacts R 25 and R 28 and the jumper wire connecting them. Since contacts 61 and 63 are in engagement with the L and R contact fingers of the magnetic switch, the circuit will be closed from line wire L 1 thru wire 77, magnet 76, wire 79, master controller O, wire 82, limit switch M, and wire 81 to line wire L 2. This energizes the electro-magnet 76 and causes the magnetic switch to be closed so as to operate the motor 39 in the reverse direction. This draws link 46 to the right as shown in Figs. 3 and 6 and as indicated by the letter R. This motion will continue until the contact 63 leaves the contact R of the limit switch, when the circuit will be broken and the magnetic switch will open, thus stopping the motor 39. However, stopping of the motor 39 does not stop the driving motor nor does it stop the actuation of the controlled machine, the clutch 13 being still in action and causing reverse motion thereof. When the controlled machine has been actuated far enough it will be stopped by turning the crank 23 to the stop position which will again connect contact finger RL with finger FS and finger FL with finger RS and the current will then find its way from line L 1 through wire 77, magnet 75, wires 78 and 84, contact 65, limit switch M and wire 81 to line wire L 2. This energizes magnet 75 closing the magnetic switch to the motor 39 and causing forward motion thereof to withdraw clutch sleeve 51, throwing out of action reverse clutch 13. The motor 39 will continue to run until the limit switch M has reached the S position in which contact finger RS no longer engages contact 65, thereby de-energizing magnet 75 and stopping the motor in the neutral or S position shown in Figs. 3 and 6.

It will be seen from the foregoing that it is impossible to cause overrunning of the clutch actuating motor as this is automatically stopped at the proper point by the mechanism described. Also, attention is called to the fact that operating the crank 23 in one direction from the S position actuates the clutch which causes advancement of the controlled machine and actuating the crank in the other direction from the S position actuates the clutch which causes reversal of the controlled machine. It is therefore possible to manually control the functioning of the controlled machine so as to advance or retract the operating parts thereof (or stop the same) at any time and in any amount desired, within the capacity of the machine. It is also evident that the operation of the crank will be very simple and will require very little effort in comparison with the amount of effort which is required for actuation of the clutch sleeve in such a machine, made in accordance with the practice heretofore prevailing.

It is sometimes desirable to have a control so arranged that the controlled machine will advance to a definite point and then be automatically stopped. Such an arrangement is shown in Fig. 2 where the wire 80 is interrupted and its two ends connected to switch contacts 87 and 88. When the switch blade 89 connects these contacts the machine will operate as described above and when the switch blade is separated from the contacts 87 and 88, wire 80 will be interrupted, thus breaking the circuit to magnet 75 and stopping forward motion of the control motor 39.

Leads 90 and 91 are carried from wires 79 and 83 to contacts 92 and 93, respectively. When the controlled machine in its advance causes switch 100 to interrupt the circuit through wires 101 and 102, the electromagnet 97 will be de-energized and blade 89 will engage contacts 92 and 93, the circuit being closed through reverse magnet 76, wire 83, limit switch M and wire 81, notwithstanding the fact that the master controller and limit switch are both set in forward position. This will close the magnetic switch for reverse operation of motor 39, thereby withdrawing clutch sleeve 51 and releasing the forward clutch, thus stopping the operation of the controlled machine. It will be seen from this that the first step in this method of control is to break the circuit to the forward coil 75, then to make the circuit to the reverse coil 76, thereby reversing the motor and releasing the forward clutch and stopping the machine again.

After this has been done, the controlled machine may be again operated and the automatic stop switch reset for the next operation. This is done by pressing the reset button 94 to close the circuit from the line wires L1 and L2 through wires 95 and 96. These are connected to the coil of an electromagnet 97 whose movable armature draws the bar 98 in a direction to cause switch blade 89 to engage the contacts 87 and 88. The machine is then in condition to function as described above. The wire 103 and switch 104 constitute simply an ordinary interlocking switch such as is customarily used in constructions of this character. While the automatic cutout is shown as being mounted upon a shaft (Fig. 2), it has also been mounted for actuation by a sliding member.

Various other applications of this control system may be designed for the control or operation of machines and mechanical movements of various kinds and it will therefore be understood that the specific description of structures and methods set forth above may be departed from without departing from the spirit of my invention as set forth in this specification and the appended claims.

Having now described my invention, I claim:

1. The combination with a driving member and a driven member to be connected therewith, of a selectively operated apparatus and a motor for actuating said apparatus to a plurality of positions for controlling the connection between said members, a manually operated means for starting said motor in one direction or the other for controlling the actuation of said selective apparatus, automatic means associated with said motor for controlling the direction of rotation of the motor and for stopping the motor when said selective member has been actuated from one position to another, and means on said driven member effective to cause said motor to actuate the selective apparatus to another position after the driven member has been operated by the driving member a predetermined amount.

2. The combination with a machine including a rotary driving member continuously rotated in one direction, and a member to be driven thereby in one direction or the other, of selective driving means operative to positions for connecting said members to drive the driven member in either direction or to disconnect the drive therebetween, an electric motor for operating said selective driving means, and means associated with said motor for controlling its actuation of said selective driving means, and means actuated by the driven member when said member has been driven a predetermined amount for effecting the operation of the motor to actuate said selective driving means to another position.

3. The combination with a machine including a driving shaft continuously rotated in one direction, a member to be driven by said driving shaft in one direction of rotation or the other, driving connections between said member and said shaft, and a pair of connecting clutches in said driving connections, one operative to connect the driving shaft for driving the driven member in one direction and the other for driving in the other direction, of electrical means for selectively operating said clutches to driving relationship in said connections and for releasing the clutches, a manual control means for effecting the actuation of said electrical clutch operating means, and means actuated by the driven member after said member has been driven a predetermined amount for causing said electrical means to disconnect the clutch and thereby stop the driven member.

4. The combination with a machine, a motor for controlling the operation thereof, and a source of electric power, of a system for controlling the motor from said source of electric power for controlling the operation of the machine comprising, switch mechanism having electro-magnetic operating coils for connecting said motor to said source of power for forward or reverse rotation, a limit switch having a plurality of contacts, means for moving said limit switch contacts by the operation of the motor, a master controller switch provided with a plurality of contacts for selectively connecting one or the other of said electro-magnetic operating coils to the source of power through said limit switch and master controller switch upon the operation of said master controller switch until the contacts of said limit switch have been moved a predetermined amount by said motor to de-energize the selected electro-magnetic operating coil and stop the motor, and means functioning after the machine controlled by said control mechanism has operated a predetermined amount to automatically cause a reverse operation of said motor.

5. The combination with a machine, a motor for controlling the operation thereof, and a source of electric power, of a system for controlling the motor from said source of electric power for controlling the operation of the machine comprising, switch mechanism having electro-magnetic operating coils for connecting said motor to said source of power for forward or reverse rotation, a limit switch having a plurality of stationary and movable contacts, means for moving said movable limit switch contacts by the operation of the motor, a master controller switch provided with a plurality of contacts for selectively connecting one or the other of said electro-magnetic operating coils to the source of power through said limit switch and master controller switch upon the operation of said master controller switch until the contacts of said limit switch have been moved a predetermined amount by said motor to de-energize the selected electro-magnetic operating coil and stop the motor, means functioning after the machine controlled by said control mechanism has operated a predetermined amount to automatically cause a reverse operation of said motor, and a manual switch to reset the limit switch so that the operation of the motor may be continued.

6. The combination with a machine, a motor for controlling the operation thereof, and a source of electric power, of a system for controlling the motor from said source of electric power for controlling the operation of the machine comprising, switch mechanism having electro-magnetic operating coils for connecting said motor to said source of power for forward or reverse rotation, a limit switch having a plurality of contacts, means for moving certain of said limit switch contacts to three positions by the operation of the motor, a master controller switch manually operable to three positions corresponding to the three positions of the limit switch and provided with a plurality of contacts for selectively connecting one or the other of said electro-magnetic operating coils to the source of power through said limit switch and master controller switch upon the operation of said master controller switch from one position to another until the contacts of said limit switch have been moved to the corresponding position of the controller switch by said motor to de-energize the selected electro-magnetic operating coil and stop the motor, and means functioning after the machine controlled by said control mechanism has operated a predetermined amount to automatically cause a reverse operation of said motor thereby moving the limit switch to another position.

7. The combination with a machine, a driving member, a connecting means therebetween, of a control system therefor including a master controller switch, a limit switch operating therewith, a motor connected with said limit switch to operate the same in response to the operation of said master controller switch and simultaneously operative on said connecting means between the machine and driving member to effect a driving relationship therebetween and to disconnect the driving member to stop the machine, and means actuated by the machine after said machine has been driven a predetermined amount for effecting a disconnection of the connecting means and thereby stop the driving of the machine by the driving member.

In witness whereof, I hereunto subscribe my name to this specification.

HENRY E. HINTZ.